United States Patent [19]

McMenim

[11] 3,925,440

[45] Dec. 9, 1975

[54] CARBOXAMIDES

[75] Inventor: Michael Edward McMenim, Macclesfield, England

[73] Assignee: Imperial Chemical Industries Limited, London, England

[22] Filed: May 31, 1974

[21] Appl. No.: 475,272

Related U.S. Application Data

[62] Division of Ser. No. 270,928, July 10, 1972, Pat. No. 3,845,070.

[30] Foreign Application Priority Data

July 27, 1971 United Kingdom............... 35206/71

[52] U.S. Cl............ 260/457; 260/558 P; 260/562 R
[51] Int. Cl.$^2$............. C07C 103/44; C07C 103/82; C07C 141/02
[58] Field of Search.................... 260/558, 562, 457

[56] References Cited
UNITED STATES PATENTS
3,145,209   8/1964   Krapcho ........................... 260/562

*Primary Examiner*—Harry I. Moatz
*Attorney, Agent, or Firm*—Cushman, Darby & Cushman

[57] ABSTRACT

Process for manufacture of tetramisole and corresponding nitrophenyl, aminophenyl and tolyl derivatives, which comprises ring-closing a 2-imino-3-(2-amino-2-phenylethyl)thiazolidine derivative, e.g. by heating said thiazolidine derivative under reflux in water at a pH below 8. Two processes for manufacture of said thiazolidine derivatives used as intermediates: (a) hydrolysis of corresponding acylamino derivative, (b) reacting an N-(2-amino-2-phenylethyl)-ethylamine derivative with thiourea or a thiocyanate or isothiocyanate.

7 Claims, No Drawings

CARBOXAMIDES

This is a division of application Ser. No. 270,928, filed July 10, 1972 and now U.S. Pat. 3,845,070.

Tetramisole, i.e., dl-2,3,5,6-tetrahydro-6-phenylimidazo[2,1-b]thiazole, and its pharmaceutically-acceptable acid-addition salts, and the corresponding laevorotatory compounds, and corresponding nitrophenyl, aminophenyl and tolyl derivatives, are known to have anthelmintic activity. This invention relates to a new process for the manufacture of tetramisole and analogues thereof, and salts thereof, and to new intermediates used in said new process, and to processes for their manufacture.

According to the invention there is provided a process for the manufacture of compounds of the formula:

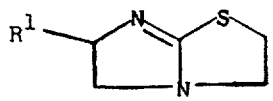   I wherein $R^1$ stands for a phenyl, nitrophenyl, aminophenyl or tolyl radical, and pharmaceutically-acceptable acid-addition salts thereof, which comprises ring-closing a compound of the formula:

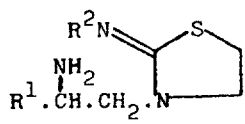   II wherein $R^1$ has the meaning stated above and $R^2$ stands for hydrogen or an alkyl, alkenyl, aralkyl or aryl radical, or an acid-addition salt thereof.

When $R^1$ stands for a nitrophenyl, aminophenyl or tolyl radical it may be, for example, a m-nitrophenyl, m-aminophenyl or m-tolyl radical. When $R^2$ stands for an alkyl or alkenyl radical it may be, for example, one of not more than five carbon atoms, for example a methyl, ethyl, isopropyl, isobutyl, isoamyl, 3-pentyl or allyl radical. When $R^2$ stands for an aryl or aralkyl radical it may be, for example, one of not more than 10 carbon atoms, for example a phenyl or benzyl radical.

The said ring-closure may be carried out in several alternative ways. In one alternative the thiazolidine starting material is reacted in water at an elevated temperature, for example at 80° to 150°C., for example under reflux, and at a pH below 8, and preferably at a pH of 2 to 4. In another alternative (only applicable when $R^2$ stands for hydrogen) the thiazolidine starting material is reacted in water with nitrous acid, and this reaction is preferably carried out at approximately room temperature. The nitrous acid may be formed in situ in the reaction mixture by the use of a nitrite, for example an alkali metal nitrite, and an acid, for example an inorganic acid, for example hydrochloric acid. In another alternative the thiazolidine starting material is heated at 200° to 300°C., and more particularly at 230° to 260°C. In this alternative the starting material may be heated alone or it may be heated in the presence of an inert diluent which is stable at 200° to 300°C., for example a mixture of diphenyl and diphenyl ether. In another alternative the thiazolidine starting material is heated at 100° to 150°C. in a dipolar aprotic solvent, for example dimethylformamide.

It is believed that the above-mentioned ring-closure process proceeds by the following mechanism (except in the alternative involving nitrous acid):

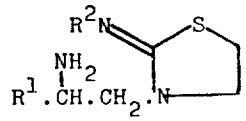   II or an acid-addition salt thereof

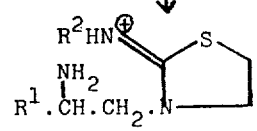   III ("mono salt")

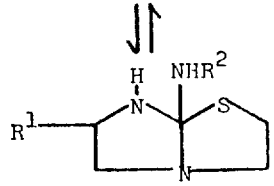   IV or a protonated derivative thereof

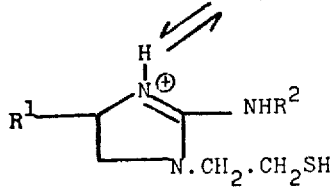

V    VI tetramisole or analogue (protonated form)

The compounds of the formula IV are transient intermediates which cannot be isolated. The compounds of the formula V are relatively unstable as they are readily oxidised, but nevertheless it is possible to isolate them. According to a further feature of the invention, therefore, we provide compounds of the formula:

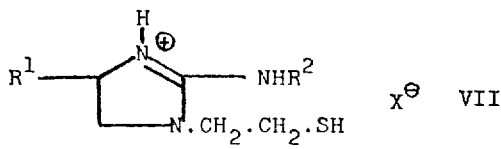   VII wherein $R^1$ and $R^2$ have the meanings stated above and $X^-$ stands for an anion.

A specific compound of the formula VII is, for example 2-amino-3-(2-mercaptoethyl)-5-phenylimidazole hydrochloride.

The compounds of the formula VII, wherein $R^1$, $R^2$ and $X^-$ have the meanings stated above, can be obtained by adjusting an aqueous solution of an acid-addition salt of the formula II, wherein $R^1$ and $R^2$ have the meanings stated above, to pH 7, and isolating the product in conventional manner.

According to a further feature of the invention there are provided compounds of the formula II, wherein $R^1$ and $R^2$ have the meanings stated above, and acid-addition salts thereof.

Preferred compounds of the formula II are 2-imino-3-(2-amino-2-phenylethyl)thiazolidine dihydrochloride, 2-allyl-imino-3-(2-amino-2-phenylethyl)thiazolidine dihydrochloride and 2-methylimino-3-(2-amino-2-phenylethyl)thiazolidine dihydrochloride.

According to a further feature of the invention there is provided a process for the manufacture of compounds of the formula II, wherein $R^1$ and $R^2$ have the meanings stated above, and acid-addition salts thereof, which comprises hydrolysing a compound of the formula:

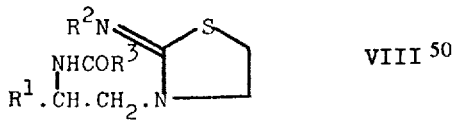   VIII wherein $R^1$ and $R^2$ have the meanings stated above, and $R^3$ stands for hydrogen or an alkyl, aryl or aralkyl radical, or an acid-addition salt thereof, under acidic conditions.

When $R^3$ stands for an alkyl radical it may be, for example, an alkyl radical of not more than five carbon atoms, for example a methyl radical. When $R^3$ stands for an aryl or aralkyl radical it may be, for example, an aryl or aralkyl radical of not more than 10 carbon atoms, for example a phenyl or benzyl radical. Suitable hydrolytic agents are aqueous solutions (preferably with a Hammett acidity function below zero) of strong acids, for example hydrochloric, hydrobromic or sulphuric acid. The hydrolysis is conveniently carried out at about 80°–120°C., for example under reflux.

The starting materials of the formula VIII may be obtained as outlined below, and as described in more detail in the Examples:

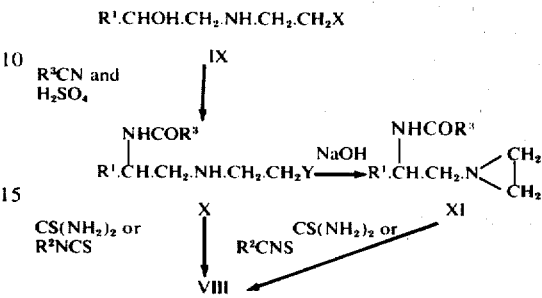

In these formulae $R^1$, $R^2$ and $R^3$ have the meanings stated above, X stands for a chlorine or bromine atom or a hydroxy radical, and Y stands for a chlorine or bromine atom or a hydrogen-sulphato radical ($-OSO_3H$).

According to a further feature of the invention there is provided a process for the manufacture of compounds of the formula II, wherein $R^1$ and $R^2$ have the meanings stated above, and acid-addition salts thereof, which comprises reacting a compound of the formula:

   XII wherein $R^1$ and Y have the meanings stated above, or an acid-addition salt thereof, with thiourea or a compound of the formula $R^2NCS$, wherein $R^2$ has the meaning stated above.

This process is conveniently carried out in the presence of water, and optionally an alkanol of not more than 5 carbon atoms, for example ethanol, may be present also. In the case where the sulphur-containing reactant is thiourea, the process is carried out at 80° to 120°C., for example under reflux, and at pH to 5, which may be provided by the presence in the reaction mixture of an appropriate amount of an inorganic or organic acid, for example sulphuric, hydrochloric or p-toluenesulphonic acid. In the case where the sulphur-containing reactant is $R^2NCS$, the reaction may be carried out under basic to mildly acidic conditions, i.e., at pH 6 to 11. In the case where $R^2$ stands for hydrogen (i.e., $R^2NCS$ is thiocyanic acid) there may be used a corresponding salt, i.e., a thiocyanate, for example ammonium thiocyanate or an alkali metal thiocyanate, for example sodium or potassium thiocyanate, at a pH of 0 to 5.

The starting materials of the formula XII can be obtained as outlined below, and as described in more detail in the Examples:

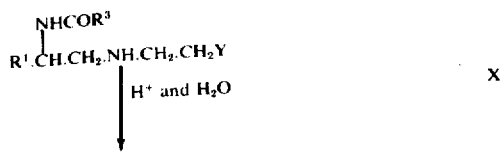   X

-continued

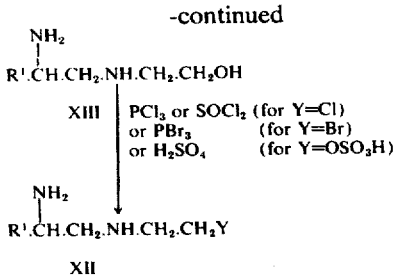

XII

According to a further feature of the invention there are provided compounds of the formula X, wherein $R^1$, $R^3$ and Y have the meanings stated above, and acid-addition salts thereof.

As specific compounds of the formula X there may be mentioned, for example, N-(2-acetylamino-2-phenylethyl)-ethanolamine-O-sulphate, and the analogous 2-phenylacetylamino-and 2-benzoylamino derivatives, and N-(2-acetylamino-2-phenylethyl)-2-chloroethylamine.

According to a further feature of the invention there is provided a process for the manufacture of compounds of the formula X, wherein $R^1$, $R^3$ and Y have the meanings stated above, and acid-addition salts thereof, which comprises reacting a compound of the formula IX, wherein $R^1$ and X have the meanings stated above, or an acid-addition salt thereof, with a compound of the formula $R^3CN$, wherein $R^3$ has the meaning stated above, in the presence of concentrated sulphuric acid at −20°C. to 60°C., and preferably at −10°C. to 25°C. In the case where $R^3$ stands for hydrogen there may be used a corresponding salt, for example ammonium cyanide or an alkali metal cyanide, for example sodium or potassium cyanide.

The invention is illustrated but not limited by the following Examples:

EXAMPLE 1

Sulphuric acid (98% w/w; 80g.) was added to acetonitrile (12.3g.) with stirring below 5°C. The solution was cooled to −10°C., and N-(2-hydroxy-2-phenylethyl)ethanolamine (18.1g.) was added in portions over 15 minutes, maintaining the temperature below 0°C. The reaction mixture was stirred at 0°C. for 1 hour and then at 25°C. for 2 hours. The mixture was then poured onto ice (200 g.) and the resulting mixture adjusted to pH 5 with 18N-sodium hydroxide, adding ice to keep the temperature below 10°C. The solution was evaporated to dryness at 50°C./15mm. The residue was extracted with ethanol (500ml.), and the extract was filtered and the filtrate evaporated at 50°C. in vacuo to dryness. The residue was dissolved in boiling ethanol (100ml.), and the solution allowed to cool to room temperature. The resulting crystals were filtered off, washed once with ethanol (20ml.), and dried at 70°C. to give N-(2-acetylamino-2-phenylethyl)ethanolamine-O-sulphate, m.p.210°–212°C.

EXAMPLE 2

3-(2-Acetylamino-2-phenylethyl)-2-iminothiazolidine (2g.) was dissolved in 5N-hydrochloric acid (15 ml.), and the solution refluxed for 6 hours. The solution was evaporated to dryness at 60°C./15mm. to give a crystalline solid, which was dissolved in ethanol (20ml.) and the solution refluxed for 5 minutes. The solution was cooled to room temperature, the resulting mixture filtered, and the crystalline residue washed with ethanol (20ml.) and dried at 50°C. to give 3-(2-amino-2-phenylethyl)-2- iminothiazolidine dihydrochloride, m.p.202°–205°C.

The thiazolidine derivative used as starting material was obtained as follows:

A solution of N-(2-acetylamino-2- phenylethyl)ethanolamine-O-sulphate (3.02g.) in water (10ml.) was added to a solution of sodium hydroxide (1.2g.) in water (10ml.) at 70°C. The solution was refluxed for 30 minutes and then cooled and extracted with methylene dichloride (2 × 20ml.). The combined extracts were dried over anhydrous sodium sulphate and evaporated at 30°C. in vacuo to give a white solid. This was crystallised from ethyl acetate to give N-(2-acetylamino-2-phenylethyl)aziridine, m.p.114°–116°C.

The said aziridine derivative (0.51g.) was added to a stirred solution of thiourea (0.228g.) and sulphuric acid (98% w/w; 0.14ml.) in water (3ml.) at 20°C. The solution was allowed to stand at room temperature for 10 minutes and then heated on the steam bath for 4 hours. The solution was cooled and made alkaline (pH 11) with 18N-sodium hydroxide, extracted with methylene dichloride (2 × 20ml.), and the combined extracts evaporated to dryness at 30°C. in vacuo. The residue was dissolved in benzene (5ml.), and the product precipitated by addition of ether (5ml.). The precipitate was filtered off, washed with ether (5ml.), and allowed to dry in air at room temperature to give 3-(2-acetylamino-2-phenylethyl)-2-iminothiazolidine, m.p.136°–138°C.

EXAMPLE 3

3-(2-amino-2-phenylethyl)-2-iminothiazolidine dihydrochloride (1g.) was dissolved in water (10ml.) and the solution refluxed for 16 hours. The solution was then basified to pH 11 with 2N-sodium hydroxide, extracted with methylene dichloride (2 × 20ml.), the combined extracts dried with anhydrous sodium sulphate and evaporated to dryness at 30°C. in vacuo. The residue was dissolved as much as possible in benzene (20ml.), the mixture filtered, and a saturated solution of hydrogen chloride in isopropanol added to the filtrate until it had pH 2–3. The resulting white precipitate was filtered off, washed successively with benzene (5ml.) and ether (5ml.) and dried in air at room temperature to give tetramisole hydrochloride, m.p.255°–258°C. After crystallisation from ethanol, a sample had m.p.258°–260°C.

EXAMPLE 4

Sulphuric acid (98% w/w; 80g.) was added to stirred benzyl cyanide (39g.) at a temperature below 5°C. The solution was cooled to −10°C., and N-(2-hydroxy-2-phenylethyl)-ethanolamine (18.1g.) was added in portions over 15 minutes, maintaining the temperature below 0°C. The reaction mixture was stirred at 0°C. for 1 hour, and then at 25°C. for 2 hours. The mixture was poured onto a stirred mixture of ice (200g.) and ethyl acetate (200ml.). The resulting white precipitate was filtered off, washed successively with ethyl acetate (200ml.) and water (200ml.), and then crystallised from water to give N-(2-phenylacetylamino-2-phenylethyl)ethanolamine-O-sulphate, m.p.228°–229°C.

In a similar manner, using an equivalent amount of phenyl cyanide in place of the benzyl cyanide, there was obtained N-(2-benzoylamino-2-phenylethyl)ethanolamine-O-sulphate, m.p.236°–239°C.

EXAMPLE 5

2-Methylimino-3-(2-phenylacetylamino-2-phenylethyl)thiazolidine (3.53g.) was dissolved in 5N-hydrochloric acid (15ml.) and the solution was refluxed for 9 hours. The solution was evaporated to dryness at 60°C. in vacuo and the crystalline residue was crystallised from ethanol, washed successively with ethanol (5ml.) and acetone (10ml.), and dried at 80°C., to give 3-(2-amino-2-phenylethyl)-2-methyliminothiazolidine dihydrochloride, m.p.195°–198°C.

The same product was obtained by hydrolysing 3-(2-acetylamino-2-phenylethyl)-2-methyliminothiazolidine by the method described immediately above.

The thiazolidine derivatives used as starting materials were obtained as follows:

N-(2-phenylacetylamino-2-phenylethyl)ethanolamine-O-sulphate (7.56g.) was suspended in water (20ml.), and 2N-sodium hydroxide was added to pH 9. A solution of methyl isothiocyanate (2ml.) in ethanol (10ml.) was then added dropwise to the stirred solution, and stirring was continued for 2 hours at room temperature. The solution was adjusted to pH 12 with 18N-sodium hydroxide, extracted with methylene dichloride (2 × 25ml.), the combined extracts dried with anhydrous sodium sulphate, and evaporated to dryness at 30°C./15mm. The solid residue was dried in air at room temperature to give 2-methylimino-3-(2-phenylacetylamino-2-phenylethyl)thiazolidine. A sample recrystallised from a mixture of benzene and petroleum ether (b.p.60°–80°C.) had m.p.144°–145°C.

In a similar manner, using an equivalent amount of N-(2-acetylamino-2-phenylethyl)ethanolamine-O-sulphate in place of the above-mentioned phenylacetylamino analogue, there was obtained 3-(2-acetylamino-2-phenylethyl)-2-methyliminothiazolidine. A sample was crystallised from a mixture of benzene and petroleum ether (b.p.80°–100°C.), and then had m.p.130°–133°C.

EXAMPLE 6

3-(2-Amino-2-phenylethyl)-2-methyliminothiazolidine dihydrochloride (1.54g.) was dissolved in water (10ml.) and the solution refluxed for 22 hours, maintaining the pH of the solution at 4 ± 1 by periodic addition of 2N-sodium hydroxide. The solution was then adjusted to pH 11 with 2N-sodium hydroxide, extracted with methylene dichloride (2 × 20 ml.), and the combined extracts dried ($Na_2SO_4$) and evaporated to dryness at 30°C./15mm. The residue was dissolved as much as possible in benzene (20ml.), the mixture filtered, and the filtrate adjusted to pH 2–3 by the addition of a saturated solution of hydrogen chloride in isopropanol. The resulting white precipitate was filtered off, washed with chloroform (10ml.), and dried in air at room temperature to give tetramisole hydrochloride, m.p.255°–258°C.

EXAMPLE 7

3-(2-Amino-2-phenylethyl)-2-iminothiazolidine dihydrochloride (0.75g.) was dissolved in water (4.0ml.), and sodium nitrite (0.40g.) was added. The solution was stirred until the sodium nitrite had dissolved, and 5N-hydrochloric acid (0.20ml.) was then added. Samples (about 5μl.) of the resulting solution were then applied to thin layer chromatographic plates made up from Merck silica gel GF 254. The plates were eluted with a solvent made up from toluene (50 parts by volume), acetone (50 parts by volume), and ammonium hydroxide (specific gravity 0.880; 1.5 parts by volume). The products of the reaction were identified by comparison with authentic samples using $R_F$ values and the characteristic colours obtained on spraying the plates with a mixture of equal parts of a 0.3% w/v aqueous solution of chloroplatinic acid and a 6% w/v aqueous solution of potassium iodide. The products of the reaction were thus shown to be tetramisole, 2-imino-3-styrylthiazolidine and 2-imino-3-(2-hydroxy-2-phenylethyl)thiazolidine, in the approximate ratio of 1:1:2.

EXAMPLE 8

2-Methylimino-3-(2-phenylacetylamino-2-phenylethyl)-thiazolidine (3.0g.) was suspended in a mixture of water (7.5ml.) and aqueous hydrobromic acid (48% w/w; 7.5ml.) and refluxed for 10 hours. The resulting solution was evaporated to dryness at 15mm. and the crude product crystallised from isopropanol to give 3-(2-amino-2-phenylethyl)-2-methyliminothiazolidine dihydrobromide, m.p.236°–238°C.

EXAMPLE 9

3-(2-Amino-2-phenylethyl)-2-methyliminothiazolidine dihydrobromide (0.50g.) was dissolved in water (5ml.) and the solution was refluxed for 18 hours. The solution was evaporated to dryness at 15mm. Isopropanol (20ml.) was added to the residue, the mixture was refluxed for 5 minutes and then allowed to cool to room temperature. The resulting mixture was filtered and the solid residue was washed with acetone (5ml.) and dried at 50°C. to give tetramisole hydrobromide, m.p.238°–242°C. (decomposition).

EXAMPLE 10

2-Ethylimino-3-(2-phenylacetylamino-2-phenylethyl)thiazolidine (10.2g.) and 5N-hydrochloric acid (40ml.) were refluxed for 10 hours, and the resulting solution was evaporated to dryness at 15mm. The residue was crystallised from isopropanol (50ml.) to give 2-ethylimino-3-(2-amino-2-phenylethyl)thiazolidine dihydrochloride, m.p.188°–191°C.

This dihydrochloride (1.0g.) was dissolved in water (2ml.) and basified to pH 10 with aqueous ammonia solution (specific gravity 0.880). The oil which precipitated was extracted with methylene chloride (20ml.). The extract was dried ($MgSO_4$) and evaporated to dryness at 15mm. to give 2-ethylimino-3-(2-amino-2-phenylethyl)thiazolidine as a colourless oil. The infrared spectrum of the oil had strong absorptions at 3360; 3280; 2980; 2860; 1630; 1440; 1350; 1290; 1240; 1190; 765 and 710cm.$^{-1}$ The 2-ethylimino-3-(2-phenylacetylamino-2-phenylethyl)thiazolidine used as starting material was obtained as follows:

N-(2-Phenylacetylamino-2-phenylethyl)ethanolamine-O-sulphate (18.9g.) was dissolved in 2N-sodium hydroxide (25ml.) and water (25ml.). Ethanol (25ml.) and ethyl isothiocyanate (4.35g.) were added. The pH of the solution was then maintained at 9 ± 0.5 by the addition of 2N-sodium hydroxide until a total of 25 ml. had been added. Water (25ml.) was then added, and the mixture was filtered. The solid residue was washed successively with water (50ml.) and petroleum ether (b.p.60°–80°C., 50ml.), and dried at 50°C. to give 2-ethylimino-3-(2-phenylacetylamino-2-phenylethyl)-thiazolidine. A sample crystallised from petroleum ether (b.p.100°-120°C.) had m.p.142°-144°C.

EXAMPLE 11

3-(2-Amino-2-phenylethyl)-2-ethyliminothiazolidine dihydrochloride (0.50g.) was dissolved in a mixture of ethanol (5ml.) and water (5ml.), and the solution was refluxed for 44 hours. The solution was then evaporated to dryness at 15mm. and the residue crystallised from isopropanol (5ml.). The resulting tetramisole hydrochloride was filtered off, washed successively with isopropanol (2ml.) and ether (10ml.), and dried at 50°C., and it then had m.p.256°-258°C.

EXAMPLE 12

3-(2-Phenylacetylamino-2-phenylethyl)-2-isopropyliminothiazolidine (7.0g.) was dissolved in 5N-hydrochloric acid (30ml.), and the solution was refluxed for 10 hours. The solution was evaporated to dryness at 15mm., and the residue crystallised from ethanol (20ml.), washed with ethanol (5ml.), and dried at 50°C. to give 3-(2-amino-2-phenylethyl)-2-isopropyliminothiazolidine dihydrochloride, m.p.206°-211°C. (decomposition).

The thiazolidine derivative used as starting material was prepared using isopropyl isothiocyanate by an analogous method to that described for the ethyl homologue in Example 10. It had m.p.112°-114°C. after recrystallisation from petroleum ether (b.p.100°-120°C.).

EXAMPLE 13

3-(2-Amino-2-phenylethyl)-2-isopropyliminothiazolidine (0.5g.) was placed in a small tube, and the tube was plunged into an oil bath at 245°C. and held at that temperature for 5 minutes. The sample was then removed, cooled to room temperature, triturated with boiling isopropanol (3ml.) and allowed to cool. The mixture was filtered, and the solid residue washed successively with isopropanol (1 ml.) and acetone 2ml.) to give tetramisole hydrochloride, m.p.255°-258°C.

EXAMPLE 14

2-Isobutylimino-3-(2-phenylacetylamino-2-phenylethyl)thiazolidine (7.6g.) was dissolved in 5N-hydrochloric acid (30ml.) and the solution was refluxed for 9 hours. The solution was then cooled to 40°C. and washed with chloroform (30ml.). The aqueous solution was evaporated to dryness at 15mm. The residue was crystallised from isopropanol (15ml.), and then washed with isopropanol (5ml.) and dried at 50°C. There was thus obtained 2-isobutylimino-3-(2-amino-2-phenylethyl)thiazolidine dihydrochloride, m.p.188°-190°C.

The thiazolidine derivative used as starting material was prepared in analogous fashion to the ethyl homologue (see Example 10). It had m.p.153°-154°C. after crystallisation from petroleum ether (b.p.100°-120°C.).

EXAMPLE 15

2-Isobutylimino-3-(2-amino-2-phenylethyl)thiazolidine dihydrochloride (0.5g.) was dissolved in dimethylformamide (2ml.) and the solution was heated at 120°C. for 40 hours. The reaction mixture was then allowed to cool, the resulting mixture wsa filtered and the crystalline solid residue was successively washed with isopropanol (2ml.) and ether (5ml.) and dried at 50°C., to give tetramisole hydrochloride, m.p.257°-259°C.

EXAMPLE 16

2-Isoamylimino-3-(2-phenylacetylamino-2-phenylethyl)thiazolidine (2.2g.) was dissolved in 5N-hydrochloric acid (10ml.) and the solution refluxed for 10 hours. The solution was evaporated to dryness at 15mm., the residue crystallised from isopropanol (10ml.), washed with isopropanol (2ml.), and dried at 50°C. There was thus obtained 2-isoamylimino-3-(2-amino-2-phenylethyl)thiazolidine dihydrochloride, m.p. 192°-198°C. (decomposition).

The thiazolidine derivative used as starting material was prepared in analogous fashion to the ethyl homologue (see Example 13). It had m.p. 135°-137°C. after crystallisation from petroleum ether (b.p. 100°-120°C.).

EXAMPLE 17

2-Isoamylimino-3-(2-amino-2-phenylethyl)thiazolidine dihydrochloride (0.20g.) was dissolved in water (5ml.) and the solution refluxed for 24 hours. After evaporation to dryness at 15mm., the residue was crystallised from isopropanol (2ml.), the product washed successively with isopropanol (1ml.) and ether (5ml.) and dried at 50°C., to give tetramisole hydrochloride, m.p.256°-259°C.

EXAMPLE 18

2-(3-Pentylimino)-3-(2-phenylacetylamino-2-phenylethyl)-thiazolidine hydrochloride (2.5g.) was dissolved in 5N-hydrochloric acid (10ml.) and the solution refluxed for 10 hours and then evaporated to dryness at 15mm. The residue was crystallised from isopropanol (10ml.), washed successively with isopropanol (2ml.) and ether (5ml.), and dried at 50°C. There was thus obtained 2-(3-pentylimino)-3-(2-amino-2-phenylethyl)thiazolidine dihydrochloride, m.p.197°-201°C. (decomposition).

This hydrochloriide (0.5g.) was dissolved in water (5ml.), and aqueous ammonia solution (specific gravity 0.880) was added to pH 9. The precipitated oil was extracted with methylene chloride (20ml.), and the extract dried (MgSO$_4$) and evaporated to dryness at 15mm. to give 2-(3-pentylimino)-3-(2-amino-2-phenylethyl)thiazolidine as a colourless oil. The infrared spectrum of the oil showed strong absorption at 3390; 3000; 2960; 2900; 1640; 1458; 1295; 1245 and 710cm.$^{-1}$ The 2-(3-pentylimino)-3-(2-phenylacetylamino-2-phenylethyl)thiazolidine hydrochloride used as starting material was prepared as follows:

N-(2-Phenylacetylamino-2-phenylethyl)ethanolamine-O-sulphate (6.43g.) was dissolved in N-sodium hydroxide (17ml.), and a solution of 3-pentyl isothiocyanate (2.2g.) in ethanol (15ml.) was added. Further N-sodium hydroxide (17ml.) was then added, and the solution was stirred for 18 hours at 25°C. and then refluxed for 2 hours. After cooling to room temperature, the reaction mixture was extracted with methylene chloride (50ml.) and the organic extract was evaporated to dryness at 15mm. The residue was dissolved in acetonitrile (15ml.), and hydrogen chloride gas was passed through the solution until the pH fell to 2 to 3. The product was then precipitated from the solution by addition of ether (15ml.) and was filtered off, washed with ether (20ml.) and dried at 50°C. A sample crystallised from ethyl acetate had m.p.145°-148°C.

EXAMPLE 19

2-(3-Pentylimino)-3-(2-amino-2-phenylethyl)-thiazolidine (0.4g.) was dissolved in water (5ml.) by adding 70% w/w perchloric acid to pH 4. The solution was then refluxed for 100 hours, cooled to room temperature, basified to pH 12 with 18N-sodium hydroxide, extracted with methylene chloride (20ml.), and the extract evaporated to dryness at 15mm. The residue was dissolved in isopropanol (5ml.) and the solution acidified to pH 2 with hydrogen chloride gas. The mixture was filtered, and the solid residue washed successively with isopropanol (2ml.) and ether (5ml.), and dried at 50°C. to give tetramisole hydrochloride, m.p.257°-259°C.

EXAMPLE 20

2-Allylimino-3-(2-phenylacetylamino-2-phenylethyl)-thiazolidine (10g.) was dissolved in 5N-hydrochloric acid (40ml.), and the solution was refluxed for 9 hours. The solution was cooled to 40°C. and washed with chloroform (50ml.). The aqueous phase was evaporated to dryness at 15mm. to give 2-allylimino-3-(2-amino-2-phenylethyl)thiazolidine dihydrochloride. A sample crystallised from a 1:1 v/v mixture of isopropanol and tetrahydrofuran had m.p. 168°-175°C. (decomposition).

The thiazolidine derivative used as starting material was prepared in analogous manner to the ethyl analogue (see Example 10). A sample crystallised from a 1:1 v/v mixture of toluene and petroleum ether (b.p.100°-120°C.) had m.p. 138°-140°C.

EXAMPLE 21

2-Allylimino-3-(2-amino-2-phenylethyl)thiazolidine dihydrochloride (0.5g.) was dissolved in water (5ml.), and the solution was refluxed for 30 hours. The solution was evaporated to dryness at 15mm., and the residue was crystallised from isopropanol (5ml.) and washed successively with isopropanol (1ml.) and ether (5ml.), to give tetramisole hydrochloride, m.p. 256°-259°C.

EXAMPLE 22

2-Ethylimino-3-(2-amino-2-phenylethyl)thiazolidine (0.65g.) was dissolved in water (10ml.) by the addition of p-toluenesulphonic acid monohydrate to pH 4. The resulting solution was refluxed for 24 hours and then evaporated to dryness at 15mm. The residue was crystallised from isopropanol (5ml.), and the crystals washed successively with isopropanol (2ml.) and ether (5ml.) and dried at 50°C. to give tetramisole p-toluenesulphonate, m.p.159°-160°C.

EXAMPLE 23

Sulphuric acid (68ml.) was added dropwise, with vigorous stirring and cooling, to acetonitrile (29ml.), maintaining the temperature below 15°C. When all of the acid had been added, N-(2-hydroxy-2-phenylethyl)ethanolamine (45.25g.) was added in small portions to the mixture, maintaining the temperature below 20°C. and stirring continuously. The reaction mixture was stirred at 20°-25°C. for 4 hours, and then poured into a mixture of water (450ml.) and toluene (50ml.). An azeotropic mixture of toluene, acetonitrile and water was then distilled from the solution until the vapour temperature reached 100°C. The distillation was stopped and the solution refluxed for 5 hours. Nitrogen was then passed over the solution which was cooled to below 60°C. while 18N-sodium hydroxide was added to pH 12. The temperature was then adjusted to 35°C. and methylene chloride (150ml.) added. The organic phase was separated and the aqueous solution extracted with three further 50ml. portions of methylene chloride, while maintaining the temperature of the solution at 35°C. in a nitrogen atmosphere. The combined methylene chloride extracts were then azeotroped until dry and a total of 150ml. of methylene chloride was distilled off. The solution of N-(2-amino-2-phenylethyl)ethanolamine so obtained was then half neutralised with hydrogen chloride gas, and added over 30 minutes to a stirred mixture of thionyl chloride (20ml.) and methylene chloride (50ml.) at 25°-30°C. The reaction mixture was stirred at 20°-25°C. for 16 hours and then comprised N-(2-amino-2-phenylethyl)-2-chloroethylamine. A solution of thiourea (15.2g.) in water (300ml.) was added. The methylene chloride was separated and discarded, and the solution was refluxed under nitrogen for 17 hours. In order to complete the cyclisation of the intermediate 2-imino-3-(2-amino-2-phenylethyl)-thiazolidine to tetramisole, the pH of the solution was then adjusted to 3.5 to 4.0 by the addition of 18N-sodium hydroxide, and the solution was refluxed for a further 5 hours under nitrogen. The pH of the solution was then adjusted to 11 to 12 by addition of 18N-sodium hydroxide, and the solution was extracted with toluene (100ml., followed by 50ml.). The combined extracts were dried (Na$_2$SO$_4$), activated carbon (2.5g.) was added, the mixture was filtered, and the solid residue was washed with toluene (25ml.). To the combined filtrate and washing was added isopropanol (35ml.), and hydrogen chloride was passed through the solution to pH 2 to 3. The mixture was allowed to cool to room temperature, and the resulting mixture filtered. The solid residue was washed with isopropanol (25ml.) and dried at 50°C. to give tetramisole hydrochloride. A sample crystallised from ethanol had m.p.258°-260°C.

EXAMPLE 24

N-(2-Amino-2-phenylethyl)-2-chloroethylamine dihydrochloride (2.715g.) was dissolved in water (15ml.), and potassium thiocyanate (0.97g.) was added. The solution was then heated at 80°C. for 16 hours, and then cooled to room temperature, made basic to pH 11 with 18N-sodium hydroxide, and extracted with methylene chloride (2 × 20ml.). The combined extracts were dried (Na$_2$SO$_4$), filtered, and a 3N-solution of hydrogen chloride in isopropanol added to the filtrate to pH 2. The solution was set aside until crystallisation was complete. The crystals were filtered off, washed successively with isopropanol (5ml.) and acetone (10ml.), and dried at 50°C. to give crude tetramisole hydrochloride. A sample crystallised from ethanol had m.p.258°-260°C.

The amino derivative used as starting material was prepared as follows:

Crude N-(2-amino-2-phenylethyl)ethanolamine, (prepared by the method described in Example 23 and isolated by evaporation of the methylene chloride extract to dryness at 15mm., and containing 88.7g of the compound) was dissolved in ethylene dichloride (450ml.). The solution was saturated with hydrogen chloride gas with vigorous stirring, and thionyl chloride (58.6ml.) was added dropwise at 50°C. over half an hour. The temperature was then raised to 70°C. for 2 hours, and isopropanol (60ml.) was then added dropwise. The reaction mixture was allowed to cool to 25°C., and the resulting mixture was filtered. The crystalline residue was washed successively with ethylene dichloride (50ml.) and acetone (50ml.), and dried at 70°C. to give N-(2-amino-2-phenylethyl)-2-chloroethylamine dihydrochloride. A sample crystallised from 1:1 v/v methanol-ethanol had m.p.194°–196°C. (sealed tube).

EXAMPLE 25

N-(2-amino-2-phenylethyl)-2-chloroethylamine dihydrochloride (5.43g.) was dissolved in water (10ml.) and ethanol (20ml.), and a solution of phenyl isothiocyanate (2.7g.) in ethanol (10ml.) was added. The pH of the solution was adjusted to 5.5 by addition of 2N-sodium hydroxide, and maintained at that value for 4 hours. The solution was acidified to pH 1 with concentrated hydrochloric acid, and evaporated to dryness at 15mm. The residue was extracted with ethanol (100ml.) under reflux, and the mixture obtained was filtered and the filtrate evaporated to dryness at 15mm. The residue was dissolved in isopropanol (5ml.), and the solution was diluted with tetrahydrofuran (500ml.) and allowed to stand for 5 days. The crystals which separated were filtered off, washed with ether (10ml.), and dried at room temperature, to give 2-phenylimino-3-(2-amino-2-phenylethyl)thiazolidine dihydrochloride, m.p.183°–186°C.

EXAMPLE 26

2-Phenylimino-(3-(2-amino-2-phenylethyl)thiazolidine dihydrochloride (0.5g.) was dissolved in water (5ml.), and the solution was refluxed for 48 hours. The reaction mixture was cooled to 25°C., basified with 2N-sodium hydroxide to pH 11, and extracted with methylene dichloride (5ml.). The organic extract was evaporated to dryness at 15mm., the residue dissolved in isopropanol (5ml.), and a 3N-hydrogen chloride solution in isopropanol added to pH 2. The precipitated product was filtered off, washed with acetone (5ml.), and dried at 50°C., to give tetramisole hydrochloride, m.p.257°–259°C.

EXAMPLE 27

N-(2-Amino-2-phenylethyl)-2-bromoethylamine di-p-toluenesulphonate (5.87g.), thiourea (1.14g.), p-toluenesulphonic acid (0.57g.) and water (15ml.) were refluxed together for 18 hours. 2N-Sodium hydroxide (1.85ml.) was then added and the solution refluxed for a further 6 hours. 2N-Sodium hydroxide was then added to pH 12, and the mixture set aside until crystallisation was complete. The crystals were filtered off, washed with water (20ml.), and dried at room temperature to give tetramisole. A sample crystallised from cyclohexane had m.p.92°–93°C.

The starting material was prepared as follows:

Crude N-(2-amino-2-phenylethyl)ethanolamine (prepared by the procedure described in Example 23 and isolated by evaporation of the dried methylene chloride extracts to dryness at 15mm.; and containing 37.0g. of the compound) was dissolved in ethylene dichloride (200ml.), and 48% w/w aqueous hydrobromic acid (25.5ml.) was added. The solution was azeotroped at 78°C. until it was anhydrous, and the residue was added dropwise over 1 hour to a mixture of ethylene dichloride (50ml.) and phosphorus tribromide (28.6ml.) at 40°C. The reaction mixture was then stirred for 16 hours at 25°C. Isopropanol (400ml.) was added, and the solution decanted from an insoluble gum. p-Toluenesulphonic acid (76.0g.) was then added to the solution, and, after stirring for 2 hours, the product [N-(2-amino-2-phenylethyl)-2-bromoethylamine di-p-toluenesulphonate] was filtered off, washed successively with isopropanol (50ml.) and ether (100ml.), and dried at room temperature, and then had m.p.190–192°C.

EXAMPLE 28

2-Imino-3-(2-benzoylamino-2-phenylethyl)thiazolidine hydrochloride (1.0g.) was suspended in 2N-sulphuric acid (50ml.), and the mixture was refluxed for six days. The mixture was then cooled to room temperature, basified to pH 12 with 18N-sodium hydroxide, extracted with toluene (25ml.), and to the toluene extract was added a 3N-solution of hydrogen chloride in isopropanol to pH 2. The precipitated product was filtered off, washed with toluene (10ml.), dried at 70°C., dissolved in water (5ml.), and basified to pH 12 with 18N-sodium hydroxide. The precipitated tetramisole was filtered off, washed with water (10ml.) and dried at 40°C., and then had m.p. 92°–93°C.

The starting material was obtained as follows:

N-(2-Benzoylamino-2-phenylethyl)ethanolamine-O-sulphate (35.0g.) was added to a mixture of a solution of sodium hydroxide (11.2g.) in water (200ml.) and toluene (200ml.), and the mixture was stirred under reflux for 2 hours. After cooling to room temperature, the mixture was separated, the aqueous phase extracted with toluene (200ml.), and the combined organic phase and the organic extract dried (MgSO$_4$) and evaporated to dryness at 15mm. There was thus obtained crude N-(2-benzoylamino-2-phenylethyl)aziridine.

This aziridine derivative (11.4g.) was dissolved in toluene (200ml.), and a solution of potassium thiocyanate (4.75g.) and concentrated hydrochloric acid (15ml.) in water (185ml.) was added. The mixture was stirred and refluxed for 4 hours, and then cooled to room temperature. The mixture was filtered, and the solid residue washed successively with water (10ml.) and toluene (10ml.), and then dried at 60°C. The solid was suspended in a mixture of 2N-sodium hydroxide (120ml.) and toluene (120ml.), and the resulting mixture stirred under reflux for 30 minutes, cooled to room temperature, and separated. The aqueous phase was extracted with further toluene (100ml.) and the combined organic phase and extract was dried (MgSO$_4$) and evaporated to dryness at 15mm. The residue was dissolved in toluene (25ml.) and to it was added a 3N-solution of hydrogen chloride in isopropanol to pH 2. The precipitate was filtered off, washed with toluene (2 × 15ml.), and dried at 70°C., to give 2-imino -3-(2-benzoylamino-2-phenylethyl)thiazolidine hydrochloride, m.p.257°–260°C.

EXAMPLE 29

3-(2-Amino-2-phenylethyl)-2-iminothiazolidine dihydrochloride (4g.) was dissolved in water (10ml.) at 98°C., and the pH was adjusted to 7 with 10N-sodium hydroxide. After 1 minute, the solution was freeze-dried to yield a white solid comprising 2-amino-3-(2-mercaptoethyl)-5-phenylimidazole hydrochloride. The infra-red spectrum of this product in purified liquid paraffin ('Nujol'; the word 'Nujol' is a trade mark) was as follows:

| Position (cm.⁻¹) | Intensity | Assignment |
|---|---|---|
| 3330 } 3260 | medium strong | —NH₂ stretch |
| 3080 | strong | N—H stretch |
| 2540 | weak | S—H stretch |
| 1675 | strong | C=N—stretch (disubstituted guanidinium*I) |
| 1608 | medium strong | NH₂ in plane bending* |
| 1575 | strong | C=N stretch (disubstituted guanidinium*II) |
| 1498 | medium | phenyl nucleus |
| 770 } 705 | medium medium strong | monosubstituted phenyl out of plane bending |

These three bands are coupled vibrations involving C=N and C—N vibrations.

EXAMPLE 30

N-(2-hydroxy-2-phenylethyl)-2-chloroethylamine hydrochloride (4.7g.) was added, with stirring at 0°C., to a mixture of acetonitrile (5.0g) and 98% w/w sulphuric acid (17.5g.), and stirring was continued for four hours. The reaction mixture was diluted with ice-cold water (50ml.) and basified to pH 9 with 18N-sodium hydroxide, keeping the temperature below 20°C. The solution was extracted with chloroform (50ml.), and the extract was dried (MgSO₄) and evaporated to dryness at 15mm. to give N-(2-acetylamino-2-phenylethyl)-2-chloroethylamine as a gum. The nuclear magnetic resonance spectrum of the product in deuteriochloroform, using tetramethyl silane as internal standard, showed the following absorptions: 2.75 p.p.m. (singlet, 5 protons); (4.95 p.p.m. (multiplet, 1 proton); 5.6 p.p.m. (singlet, 2 protons); 6.5 p.p.m. (triplet, 2 protons); 7.1 p.p.m. (multiplet, 4 protons); 8.05 p.p.m. (singlet, 3 protons).

EXAMPLE 31

2-Benzylimino-3-(2-acetylamino-2-phenylethyl)-thiazolidine (5.7g.) was dissolved in 5N-hydrochloric acid (25ml.), and the solution was refluxed for 16 hours. The solution was cooled to 20°C., filtered to remove insoluble material and the filtrate evaporated to dryness at 15mm. The gum obtained was dissolved in isopropanol (30ml.), toluene (20ml.) was added, and the solution was evaporated at 15mm. The residue was dissolved in refluxing isopropanol (15ml.), and the solution allowed to cool. The resulting mixture was filtered, and the solid residue, 2-benzylimino-3-(2-amino-2-phenylethyl)thiazolidine dihydrochloride, was washed successively with isopropanol (5ml.) and ether (10ml.) and dried at room temperature, and then had m.p. 190°–194°C. (decomposition).

The thiazolidine derivative used as starting material was prepared using benzyl isothiocyanate by an analogous method to that described for the methyl compound in Example 5. The product was not crystalline and was used without further purification.

EXAMPLE 32

2-Benzylimino-3-(2-amino-2-phenylethyl)thiazolidine dihydrochloride (1.0g.) was dissolved in water (10ml.), and the solution was refluxed for 24 hours. The solution was cooled to 5°C., basified with 18N-sodium hydroxide to pH 12 and the precipitated tetramisole filtered off, washed with water (20ml.) and dried at room temperature. The product had m.p. 92°–93°C. after recrystallisation from cyclohexane.

EXAMPLE 33

2-Imino-3-[2-acetamido-2-(3-acetamidophenyl)ethyl]-thiazolidine (prepared as described below) was dissolved in 5N-hydrochloric acid (20 ml.), and the solution was refluxed for 10 hours and then evaporated to dryness at 15mm. The residue was dissolved in warm ethanol (10ml.) and the solution allowed to cool to room temperature. The resulting mixture was filtered, and the crystalline residue washed with ethanol (2ml.) and dried at room temperature, to give 2-imino-3-[2-amino-2-(3-aminophenyl)ethyl]thiazolidine trihydrochloride, m.p. 211°–215°C. (decomposition).

The acetamido derivative used as starting material was obtained as follows:

2-Imino-3-[2-hydroxy-2-(3-acetamidophenyl)ethyl]-thiazolidine (2.37g.) was dissolved in acetonitrile (2.8g.), and 98% w/w sulphuric acid (10.2g.) was added dropwise with stirring while maintaining the temperature below 20°C. The resulting solution was stirred at room temperature for 4 hours, then poured onto ice and basified to pH 12 with 18N-sodium hydroxide, maintaining the temperature below 10°C. by the addition of ice. The solution was extracted with methylene dichloride (2 × 25ml.) and the combined extracts dried (MgSO₄) and evaporated to dryness at 15mm. to give crude 2-imino-3-[2-acetamido-2-(3-acetamidophenyl)ethyl]thiazolidine.

EXAMPLE 34

2-Imino-3-[2-amino-2-(3-aminophenyl)ethyl]-thiazolidine trihydrochloride (0.13g.) was dissolved in water (5ml.), and the solution refluxed for 17 hours. The solution was cooled to room temperature, basified with 18N-sodium hydroxide to pH 12, and extracted with methylene dichloride (2 × 10ml.). The combined extracts were dried (MgSO₄) and evaporated to dryness at 15mm. The residue was dissolved in methanol (2ml.) and the solution acidified to pH 1 with a 3N-solution of hydrogen chloride in isopropanol. The resulting mixture was evaporated to dryness at 15mm., the residue rendered solid by trituration with acetonitrile (3ml.), and the product filtered off, washed with acetonitrile (1ml.) and dried at room temperature. The product, 6-(3-aminophenyl)-2,3,5,6-tetrahydroimidazo[2,1-b]-thiazole dihydrochloride, was characterised by its mass spectrum which showed a molecular ion of mass 219.0833 (corresponding to a molecular formula of $C_{11}H_{13}N_3S$) and fragment ions of approximate masses 218 (corresponding to $C_{11}H_{12}N_3S$), 191 ($C_9H_9N_3S$ or $C_{10}H_{11}N_2S$), 163 ($C_8H_7N_2S$), 127 ($C_5H_7N_2S$), 102 ($C_3H_6N_2S$) and 45 (CHS).

What we claim is:

1. A compound which is a member selected from the group consisting of diethylamine derivatives of the formula:

wherein $R^1$ is a member selected from the group consisting of phenyl, nitrophenyl, aminophenyl and tolyl, and $R^3$ is a member selected from the group consisting of hydrogen, alkyl of not more than five carbon atoms, phenyl and benzyl and Y is a member selected from the group consisting of chlorine, bromine and hydrogen-sulphato.

2. A compound as claimed in claim 1 wherein $R^1$ is a member selected from the group consisting of phenyl, m-nitrophenyl, m-aminophenyl and m-tolyl, and $R^3$ is a member selected from the group consisting of hydrogen, alkyl of not more than five carbon atoms, phenyl and benzyl, and Y is a member selected from the group consisting of chlorine, bromine and hydrogen-sulphato.

3. A compound as claimed in claim 2 wherein $R^1$ stands for phenyl.

4. A compound as claimed in claim 1 which is N-(2-acetylamino-2-phenylethyl)ethanolamine-O-sulphate.

5. A compound as claimed in claim 1 which is N-(2-phenylacetylamino-2-phenylethyl)ethanolamine-O-sulphate.

6. A compound as claimed in claim 1 which is N-(2-benzoylamino-2-phenylethyl)ethanolamine-O-sulphate.

7. A compound as claimed in claim 1 which is N-(2-acetylamino-2-phenylethyl)-2-chloro-ethylamine.

* * * * *